United States Patent [19]
Radcliffe, Jr.

[11] 3,991,402
[45] Nov. 9, 1976

[54] PRESSURE TRANSDUCING PLATEN FOR USE IN A SIGNATURE IDENTIFICATION OR VERIFICATION SYSTEM

[75] Inventor: Arthur J. Radcliffe, Jr., Ann Arbor, Mich.

[73] Assignee: Burroughs Corporation, Detroit, Mich.

[22] Filed: Jan. 12, 1976

[21] Appl. No.: 648,049

Related U.S. Application Data

[63] Continuation-in-part of Ser. No. 525,864, Nov. 21, 1974, abandoned.

[52] U.S. Cl. .................. 340/146.3 SY; 73/432 R; 336/130
[51] Int. Cl.² .................................... G06K 9/00
[58] Field of Search ............. 340/146.3 SY, 149 R; 346/19, 26, 111, 112; 178/18, 19; 73/432 R; 336/130; 335/222

[56] References Cited
UNITED STATES PATENTS

| | | | |
|---|---|---|---|
| 3,170,987 | 2/1965 | O'Brien | 178/18 |
| 3,181,055 | 4/1965 | Bischof | 336/130 |
| 3,199,078 | 8/1965 | Gaffney, Jr. et al. | 340/146.3 SY |
| 3,480,911 | 11/1969 | Danna | 340/146.3 SY |
| 3,496,779 | 2/1970 | Peters | 73/432 R |
| 3,618,019 | 11/1971 | Nemirovsky et al. | 340/146.3 SY |
| 3,621,720 | 11/1971 | Clark | 340/146.3 SY |
| 3,781,798 | 12/1973 | Hinks | 340/146.3 R |

Primary Examiner—Leo H. Boudreau
Attorney, Agent, or Firm—Carl Fissell, Jr.; Edwin W. Uren; Kevin R. Peterson

[57] ABSTRACT

A pressure transducing apparatus which is responsive to the pressure which is exerted by an individual when he signs his signature for generating an A.C. electrical signal representative of the characteristic variations in pressure produced when an individual signs his signature for use in a signature identification or verification system. The pressure transducing platen includes a writing surface means which is positioned for receiving an individual's signature and has attached thereto a rod member having an upper non-magnetic portion rigidly attached to the bottom of said writing surface means and a lower magnetic portion which moves along a vertical axis in response to the pressure variations exerted on the writing surface. Three coils, each of which has a central hole therein, are positioned so that the magnetic portion of the rod resides within at least a portion of the central hole of each of the coils for vertical movement therein. The second or middle coil is driven by an oscillator and the first and third coils are connected in opposition to each other such that changes in the position of the magnetic portion of the rod within the central openings of the three coils will result in a differential A.C. electrical signal representative of the characteristic variations in pressure produced at the writing surface when an individual signs his signature.

10 Claims, 6 Drawing Figures

REFERENCE

DISPLACED

PRESSURE TRANSDUCING PLATEN FOR USE IN A SIGNATURE IDENTIFICATION OR VERIFICATION SYSTEM

CROSS-REFERENCE TO A RELATED APPLICATION

This application is a continuation-in-part of application Ser. No. 525,864 filed on Nov. 21, 1974 by the present inventor, and now abandoned.

This invention also relates to and is useful in a signature identification or verification system such as disclosed in U.S. Pat. No. 3,818,443 to the present inventor entitled "Signature Verification By Zero-Crossing Characterization" and to application Ser. No. 402,723 filed on Oct. 2, 1973 to the present inventor entitled "Method And Apparatus For Signal Spectrum Analysis By Hadamard Transform". This patent and patent application are assigned to the assignee of the present invention and reference is made to the following patents which are also assigned to the assignee of the present invention for a more detailed understanding of the field of use of the present invention: U.S. Pat. No. 3,528,295 to Edwin O. Roggenstein et al. entitled "Graphic Stylus"; U.S. Pat. No. 3,563,097 to Edwin O. Roggenstein et al. entitled "Conversion of Handwriting Into Electrical Signals"; and U.S. Pat. No. 3,579,186 to Robert R. Johnson et al. entitled "Personal Identification Method and Apparatus". These patents and patent applications are incorporated by reference herein.

BACKGROUND OF THE INVENTION

The need for being able to distinguish valid signatures from those which have been forged has been well established in the fields of business and banking for quite some time. Costly experience has taught that even a careful study of an individual's signature by a merchant or a banker is not an adequate safeguard since a skilled forger can often fool anyone who is not a handwriting expert. The problem of discerning between a forged signature and a valid signature is a problem which many have attempted to solve in the prior art.

Many of the more modern attempts have recognized that an individual's signature has associated therewith several distinct characteristics which can be detected by some means or another and converted into electrical signals which can be automatically processed and compared with the representation of an authentic signature for determination as to whether or not the signature currently being investigated is authentic or is a forgery.

One of the characteristics of an individual's signature which has been the focus of considerable attention is the characteristic pressure which is produced when an individual signs his signature. While this type of characteristic is not discernable to one who studies the signature on a piece of paper, or document, it can be detected and studied by other means. It has been found that the pressure variations produced when an individual signs his signature are characteristic of that individual's signature and can be used with an acceptable degree of accuracy for signature identification or verification purposes.

Most of the pressure transducing systems heretofore used in signature identification or verification systems have employed strain gages or similar transducing elements which produce a relatively weak electrical signal. Prior systems therefore have required substantial amplification before the relatively weak D.C. signal which was representative of the pressure variations produced when an individual writes his signature could be processed for signature identification purposes. The fact that these systems require the amplification of a relatively weak signal often resulted in an invalid comparison since the relatively weak signal could be lost in background noise and the like, and since the amplifiers generally used were subject to severe D.C. drift problems which often cause errors in the signal to be processed.

SUMMARY OF THE INVENTION

It is an object of this invention to provide a pressure transducing platen for use in a signature verification system.

It is another object of the present invention to provide a pressure transducing means for converting the pressure variations produced when an individual signs his signature and to an electrical A.C. signal representative thereof which can be processed for signature identification or verification purposes.

It is yet another object of the present invention to provide a relatively inexpensive pressure transducing apparatus to generate a highly reliable electrical signal requiring substantially less amplification than was previously required.

It is still a further object of the present invention to provide a pressure transducing apparatus wherein the pressure variations produced when an individual signs his signature are converted into a relatively strong electrical A.C. signal so as to eliminate the problems of D.C. drift previously associated with the amplifiers required in the prior art.

It is yet a further object of the present invention to provide a pressure transducing system for use in a signature verification or identification system which employs a differential magnetic coupling scheme to generate a relatively strong A.C. electrical signal free from drift errors and truly representative of the pressure variations produced when an individual signs his signature.

These and other objects and advantages of the present invention are accomplished in an apparatus for converting the pressure variations produced when an individual signs his signature into electrical A.C. signals representative thereof which may be further processed for signature identification or verification purposes. The present apparatus employs a pressure responsive writing surface upon which an individual signs his signature and a means for supporting the writing surface so that the pressure variations produced when an individual signs his signature thereon cause minute vertical displacements in the position of the writing surface. A rod-like member is attached to the bottom of the writing surface and has a magnetic portion extending beneath said writing surface for vertical displacement therewith. Three identical coils, each of which has a central hole therethrough, are rigidly positioned beneath the writing surface and receive the rod through the central vertically oriented holes. When no pressure is exerted on the writing surface, the rod is positioned within the holes of the three coils so that the top end of said portion of magnetic material is positioned approximately one-half of the way into the bottom of the first coil, the magnetic portion extending completely through the opening in the second coil, and the magnetic portion extending approximately one-half of the way through the top portion of the hole of the third coil. The second coil is driven by an oscillator and the first and third coils are connected in opposition to one another so that differential magnetic coupling results. As pressure is applied to the writing surface and the rod is displaced vertically within the openings in the three coils, an A.C. electrical signal is generated which is representative of the characteristic pressure variations generated when an individual signs his signature.

BRIEF DESCRIPTION OF THE DRAWINGS

Other objects, advantages and features of this invention will become more fully apparent from the following detailed description, appended claims and accompanying drawings in which like reference numerals designate corresponding parts:

DETAILED DESCRIPTION OF THE INVENTION

Figure 1:
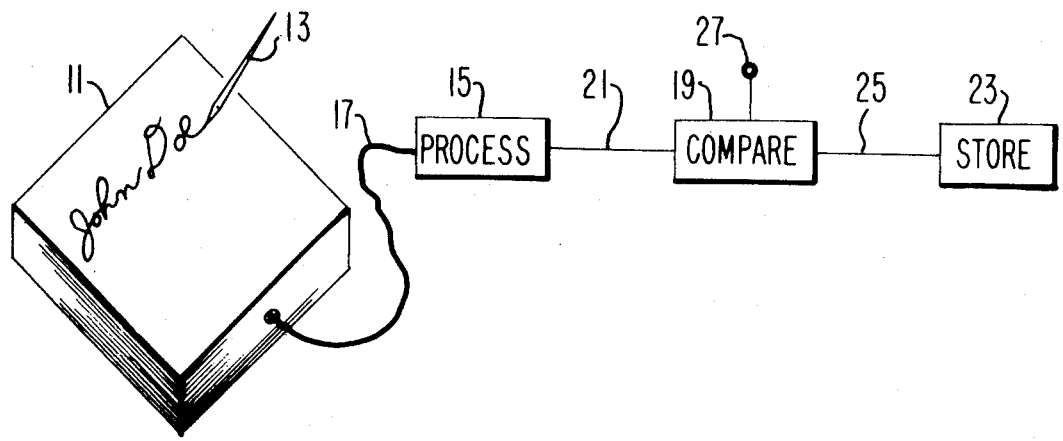
FIG. 1 shows a block diagram of a signature identification or recognition system utilizing the pressure transducing platen of the present invention.

FIG. 1 illustrates a signature identification or verification system wherein a pressure transducing means 11 is used to convert the variations in pressure which are produced when an individual signs his signature as with a pen 13 or similar means into an electrical signal which is representative of those characteristic pressure variations. This representative electrical signal is transmitted from the pressure transducing means 11 to a processing means 15 via lead 17. The processing means 15 converts the representative electrical signal into a representation of the original characteristic pressure variations which is capable of being compared with a stored representation. The comparable representation is supplied to one input of a comparator 19 via lead 21 and the other input of the comparator 19 is supplied with a pre-recorded standard or reference representation of a known signature from a memory or storage media 23 via lead 25. The comparator 19 will compare the comparable representation of the original pressure variations produced when an individual whose signature is to be tested, signed his signature, with the pre-recorded known representation which has stored in said storage means 23, and on the basis of this comparison a signal can be generated at the comparator output 27 to indicate whether or not a positive identification of the original handwritten signature to be tested has been made. This signal can be used, as known in the art, to indicate that the signature being tested is valid or that the signature being tested is a forgery.

Figure 2:
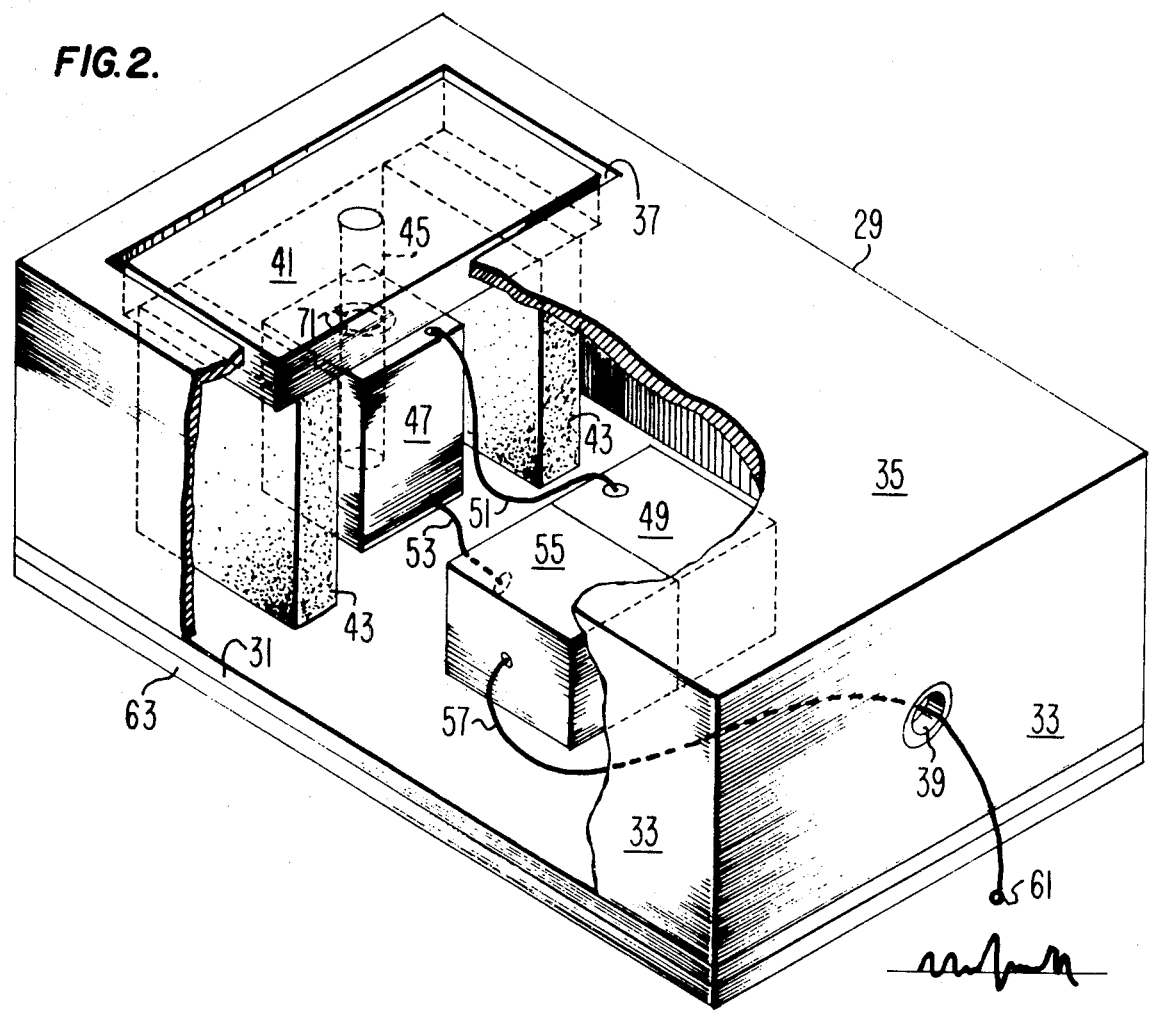
FIG. 2 is a perspective view of a housing unit incorporating the present invention and partly broken away to expose the details of the present invention.

FIG. 2 illustrates the pressure transducing apparatus of the present invention and shows a relatively rectangular box-like housing 29 having a rigid base member 31, sides 33, and an upper support surface 35. The upper support surface has a slot or opening 37 in the rear portion thereof and there is a small outlet hole 39 in one of the sides 33.

Positioned within the opening 37 is a writing surface or pressure plate 41 which has a relatively low inertia and a high resonant frequency. The writing surface may be for example, a hard aluminum alloy about one inch wide by five inches long and an eighth of an inch thick. The preferred aluminum alloy being made by Reynolds Aluminum, model X7016. The writing surface is damped to prevent "ringing" since it is supported by a pair of soft rubber support members 43 such that it is positioned within the opening 37 so that the upper surface of the writing surface 41 is flush with the top of upper support surface 35. The resiliency of the supporting members 43 is such that the writing surface 41 yields about 0.001 inches per ounce of pressure exerted on the writing surface 41. The rubber support members 43 are each constructed to have base dimensions of one inch long and a quarter inch wide, and a height dimension of an inch and a half. The preferred material for the rubber support members 43 is a silicone rubber made by Dow Corning, model 4508U.

A rod member or core 45 has an upper portion of non-magnetic material for attachment to the bottom of the writing surface member 41 so as to be vertically displaced with variations in the pressure exerted on the writing surface and a lower portion of magnetic material which serves as a magnetic core. A differential magnetic sensing means is represented by the block 47. The block 47 contains a differential magnetic coupling arrangement of electrical coils. The block is affixed to the base member 31 for positioning the various coils of the differential magnetic coupling means around the axis of the path of vertical displacement of the core 45. An oscillator which is represented by block 49 is used to drive one of the coils of the differential magnetic sensing means 47 via drive input 51, and the output of the differential magnetic sensing means 47 is fed via lead 53 to a difference amplifier as represented by block 55. The output of the difference amplifier is supplied via lead 57 through a hole 39 in one of the sides 33 to an output terminal 61. The A.C. electrical signal which is present at output terminal 61 is representative of the pressure variations produced when an individual signs his signature on the writing surface member 41 and may be processed in block 15 of the block diagram of FIG. 1 for signature identification or verification purposes. Additionally, a block of silicon rubber 63 may be cemented to the rigid base member 31 for damping the vibrations produced in the assembly hereinabove described so as to insure an error-free signal at output terminal 61 which is truly representative of the pressure applied to the writing surface 41.

Figure 3:
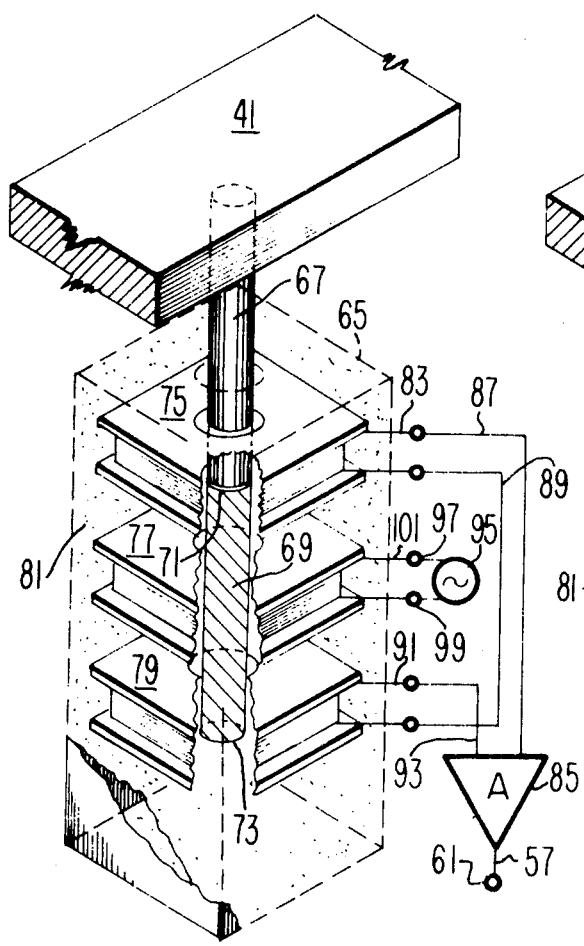
FIG. 3 is a blown-up representation of the details of the sensing means of FIG. 2 shown illustrated for the situation in which the rod is in its reference position when no pressure is exerted on the writing surface.

FIG. 3 illustrates a blown-up representation of the details of the differential magnetic sensing means 47 of the apparatus of FIG. 2. The differential magnetic sensing means 47 is represented by the dotted box 65. The rod member 45 is shown as being rigidly attached to the underside of the writing surface member 41 at the upper end of the upper portion of the rod member 67 which is comprised of non-magnetic material. A core portion 69 of magnetic material begins at the lower end of the portion of non-magnetic material 67 at juncture 71 and terminates at the lower end of the magnetic portion 69 at end 73. The rod member 45 is vertically oriented and rigidly positioned by its attachment to the lower surface of writing element 41 and it is displaced along a vertical axis as the writing surface 41 compresses support members 43 in response to the pressure exerted on the writing surface.

The differential magnetic sensing means 65 includes first, second and third electrical coils 75, 77 and 79, respectively. Each of these coils is substantially identical and may have, for example, about 200 turns of No. 39 wire on a bobbin about one quarter of an inch square and one eighth of an inch thick. Each of the bobbins has a central opening through which the rod member 45 is passed. The first, second and third coils are positioned by a coil positioning means which may include, for example, an outer box-like housing such as indicated by the box labeled 47 on the apparatus of FIG. 2, and the area inside of the box 47 and between the coils 75, 77 and 79 may be filled with a filling compound or packing material 81 so as to accurately position the coils in relation to one another. The base of the box 47 would be rigidly attached to the rigid base member 31 by any means known in the art. The position of the rod member 45 as depicted in FIG. 3 illustrates the neutral or reference position wherein no pressure is applied to the writing surface of member 41. The top interface 71 which represents the uppermost portion of the core of magnetic material 69 is positioned approximately one-half of the way into the central opening of coil 75 and the lower end 73 of the magnetic core 69 extends approximately one-half of the way into the opening of coil 79. The magnetic core portion 69 is about one-tenth of an inch in diameter and moves freely within the central holes of the bobbins of the coils 75, 77 and 79.

One end of the wire 83 which is wrapped on the bobbin of coil 75 is attached to a first input of a difference amplifier 85 via lead 87 and the opposite end of wire 83 is connected via lead 89 to one end of the wire 91 which was used to wrap the bobbin of coil 79. This connection is made such that the coil 79 is connected in inductive opposition to the coil 75, as known in the art. The other end of wire 91 is connected to the second input of difference amplifier 85 via lead 93. The output of the difference amplifier is taken via lead 57 and supplied to output terminal 61 as previously described.

An oscillator 95 has one of its outputs 97 connected to one end of the wire 101 which is wrapped upon the bobbin of coil 77 and has its other output 93 connected to the other end of wire 101. The oscillator 95 drives the coil 77 at one hundred kilohertz, at which frequency it has an impedance of approximately 1,000 ohms corresponding to an inductance in the vicinity of one millihenrys and a signal level of about ten volts. Under these conditions the coils 75 and 79, which are connected in opposition as shown, transmit a signal via leads 85 and 93, respectively, to the difference amplifier 85 whose output is one millivolt or less when the rod is positioned in the neutral or reference position as shown, and 100 millivolts when the rod is displaced one one-hundredth of an inch.

Figure 4:
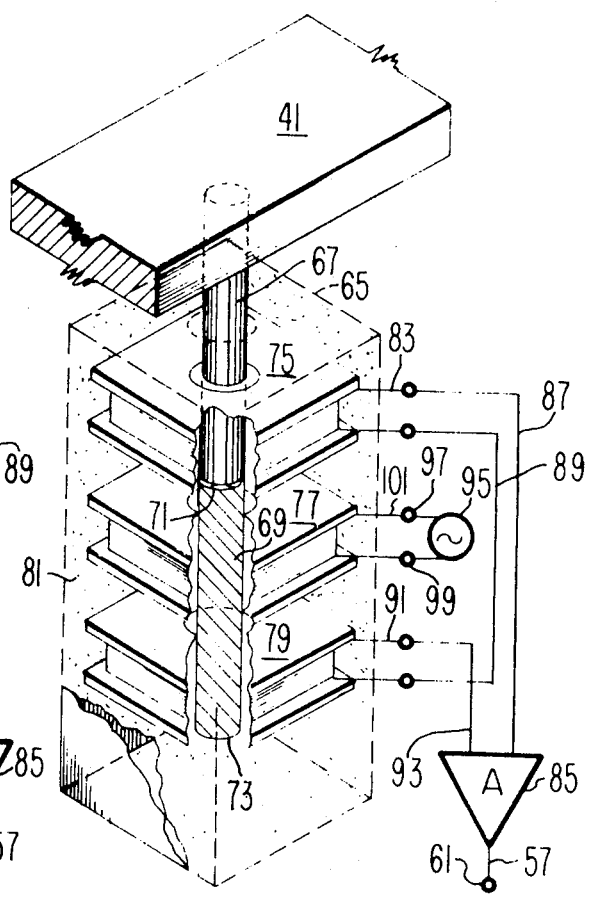
FIG. 4 is a blown-up representation of the details of the sensing means of FIG. 2 with the situation where pressure has been exerted on the writing surface and the rod has been displaced such that a difference signal is generated.

FIG. 4 is a second representation of the details of the differential magnetic sensing means 47 of the apparatus of FIG. 2 and all of the reference numerals correspond to those of FIG. 3. FIG. 4 is exactly the same as FIG. 3 except for the fact that pressure has been exerted on the writing surface element 41 causing the rod member 45 to be vertically displaced in a downward direction. As the writing surface 41 is vertically displaced a distance $d$, the magnetic core portion 69 is displaced a similar distance and this is indicated by the fact that the upper end 71 of the magnetic core portion 69 is now positioned a distance $d$ below the mid-point of coil 75 and the lower end 73 of the magnetic core 69 is positioned a distance $d$ below the center of coil 79. As the amount of magnetic material within the coils is changed, the amount in coil 75 having been decreased and the amount in coil 79 having been increased, the magnetic flux changes such that the signals present on inputs 87 and 93 are no longer equal. One signal $V_2$ will increase while the other signal $V_1$ decreases causing the output of difference amplifier 85 to vary the amplitude of the output signal in direct response to the amount of pressure exerted on the writing surface 41.

Figure 5:
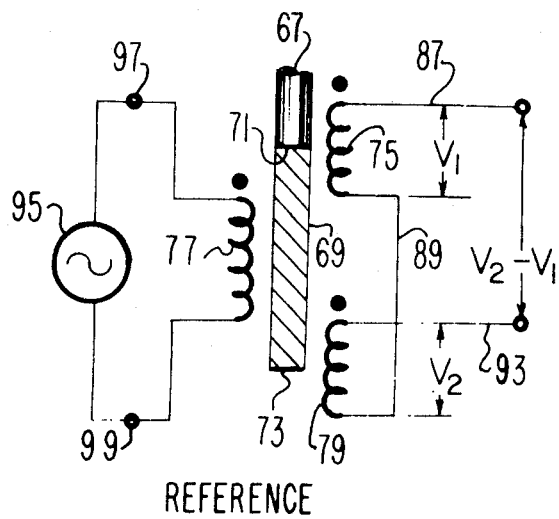
FIG. 5 represents a schematic diagram of the circuit of FIg. 3 with the core of magnetic material being illustrated in the neutral or reference position.

FIG. 5 shows an electrical schematic diagram of the differential magnetic sensing means of FIG. 3 with the magnetic core portion 69 shown in the neutral or reference position. The oscillator 95 has one input 97 coupled to one end of the wire which was used to wrap the second coil 77 and a second terminal 99 which is connected to the other end of the wire which was used to wrap coil 77. The oscillator 95 drives the coil 77 as previously indicated. The first coil 75 has one end connected to lead 87 which feeds the first input of difference amplifier 85 and its other end connected to a lead 89 which in turn connects to the second end of coil 79. The first end of coil 79 is supplied via lead 93 to the second input of the difference amplifier 95. When the system is in the neutral or reference position, as depicted in FIG. 5, the magnetic core 69 is positioned as shown with the top end 71 being positioned at the approximate mid-point of the coil 75 and the lower end 73 being positioned at the approximate mid-point of coil 79. This results in the voltage $V_1$ being approximately equal to the voltage $V_2$ and hence the input signals $V_2 - V_1$ which are fed to the difference amplifier 85 are approximately equal which results in a reference or null output indicating that no pressure is being applied to the writing surface 41.

Figure 6:
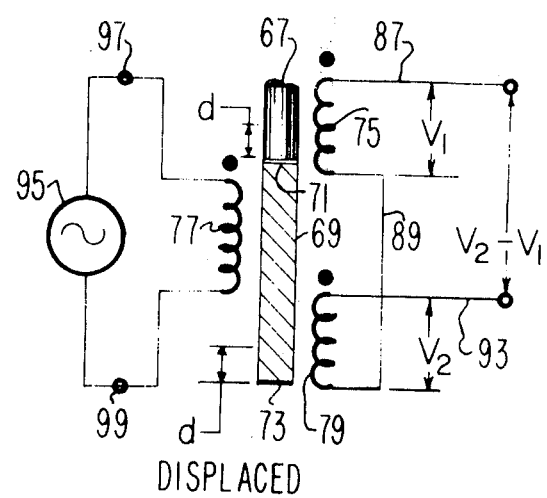
FIG. 6 represents a schematic diagram of the circuit of FIG. 4 with the core of magnetic material being illustrated in a displaced position for generating a different signal.

The Schematic diagram of FIG. 6 is the same as the schematic of FIG. 5 except that the magnetic core 69 is shown as having been displaced vertically downward a distance $d$ in response to pressure exerted on the writing surface 41. The upper end 71 of the core of magnetic material 69 is now positioned at the lower end of the first coil 75 indicating that the magnetic core has been substantially withdrawn from the coil 75, and the lower end 73 of the magnetic core 69 is closer to the bottom of the coil 79, indicating that more of the magnetic material has been inserted into coil 79. As the magnetic flux is changed in response to the amount of magnetic material within the coils, an imbalance exists between the signals $V_1$ and $V_2$ and that the signal $V_2 - V_1$, which is applied to the difference amplifier 85, is increased in magnitude such that the A.C. electrical signal which is present at output 61 is increased so as to represent the increase in pressure applied to the writing surface. The A.C. electrical signal which is generated at output 61 has a substantial magnitude and varies directly with the pressure exerted on the writing surface 41 so as to truly representative thereof.

Although specific apparatus has been shown for the purpose of describing applicant's invention, it will be apparent to those skilled in the art that other variations and modifications in the specific structures illustrated may be made without departing from the spirit and scope of the invention which is limited only by the appended claims.

What is claimed is:

1. A pressure transducing apparatus for converting the pressure variations produced when an individual signs his signature into an electrical A.C. signal representative of said pressure variations comprising:
    platen means for receiving the pressure variations produced when an individual signs his signature;
    means for supporting said platen means and for allowing said platen means to be vertically displaced in response to said pressure variations;
    rod-like means positioned in a fixed relation to said platen means for vertical movement therewith; and
    magnetic differential sensing means responsive to the movement of said rod-like means for generating an electrical A.C. signal representative of the pressure variations produced when an individual signs his signature.

2. The pressure transducing apparatus of claim 1 wherein said magnetic differential sensing means comprises:
    first, second and third electrical coil means, each of said coil means having a central opening through the vertical axis thereof;
    means for positioning said first, second and third electrical coil means for receiving said rod-like means for reciprocal movement within said central openings;
    first means for coupling said first and third electrical coil means in magnetic opposition to one another;
    oscillator means for driving said second coil means; and
    output means coupled to said first and third electrical coil means for generating a differential electrical signal in response to the reciprocal movements of said rod-like means within said central openings.

3. The pressure transducing apparatus of claim 2 wherein each of said first, second and third electrical coil means comprises:
    a spool-like bobbin means having a central axially-oriented opening therethrough for receiving said rod-like means for reciprocal movement therein; and
    an electrically conductive winding wrapped coaxially around said bobbin means and therefore around said rod-like means when it is inserted within said central opening.

4. The pressure transducing apparatus of claim 3 wherein said output means comprises:
    difference amplifier means having first and second inputs and an output for generating said electrical A.C. signal representative of said pressure variations, said difference amplifier means being responsive to the signals presented at said first and second inputs for varying said A.C. electrical signal in response to the inequality of the input signals presented at said first and second inputs;
    means for coupling one end of the electrically conductive winding of said first coil means to said first input means; and
    means for coupling one end of the electrically conductive winding of said third coil means to said second input means, the opposite ends of the first electrically conductive winding of said first coil means being coupled to the opposite end of the electrically conductive winding of said third coil means by said first coupling means for connecting said third electrical winding in magnetic opposition to said first electrical winding.

5. The pressure transducing apparatus of claim 4 wherein said rod-like means comprises:
    a first portion of magnetic material for extending into the central axially-oriented openings of said coil means, the upper extremity of said first portion being normally positioned by said supporting means in the approximate center of said first coil means and the lower extremity of said first portion being normally positioned by said supporting means in the approximate center of said third coil means for defining a reference position therein; and
    a second portion of non-magnetic material having one end for positioning said first portion for vertical movement within said central axially-oriented openings and a second end secured to said platen means for movement therewith, said rod-like means being responsive to the vertical variations in displacement of said platen means which are caused by said pressure variations exerted thereon for moving said rod-like first portion from said reference position so as to cause an electrical imbalance in the signals generated in said first and third electronically conductive windings for presentation to the first and second inputs of said difference amplifier means.

6. In a signature identification or verification system wherein an electrical signal representative of the pressure variations which are produced when an individual signs his signature are to be used for signature identification or verification purposes, said system including comparator means, means for storing a representation of an individual's known signature, means for supplying said known representation to one input of said comparator means, processing means for processing said electrical signal representative of the pressure variations which are produced when an individual signs his signature for generating a processed representation thereof, means for supplying said process representation to the other input of said comparator means, said comparator means operating to compare said stored known representation with said processed representation and having a means for indicating the existence and non-existence of a valid comparison, an inprovement comprising a pressure transducing means for generating said electrical signal representative of said pressure variations comprising:
    platen means for providing a writing surface upon which an individual signs his signature;
    resilient means for supporting said platen means for yielding in response to the pressure exerted on said platen means when an individual signs his signature thereon for permitting said platen means to be vertically displaced in response to the pressure exerted thereon;
    means rigidly attached to the underside of said platen means and having a core portion of magnetic material for positioning said core portion of magnetic material a fixed distance from the underside of said platen means for vertical displacement therewith; and differential coupling means positioned at least partially about said core portion for sensing the displacement of said core portion of magnetic material in response to the pressure exerted upon the writing surface of platen means when an individual writes his signature thereon for generating an A.C. electrical signal representative of said pressure variations.

7. The improved signature identification system of claim 6 wherein said differential coupling means comprises:

first, second and third electrical coil means, each of said coil means having a central axial bore therethrough;

means for supporting said first, second and third electrical coil means for receiving said core portion of magnetic material in said central axial bores for axial displacement therein;

oscillator means for driving said second electrical coil;

means for coupling one end of said first electrical coil means to one end of said third electrical coil means for connecting said first and third electrical coil means in opposition to one another; and difference amplifier means having one input connected to the other end of said first electrical coil means and a second input connected to the other end of said third electrical coil means for generating an A.C. electrical output signal in response to the difference in the electrical signals supplied to its inputs, said A.C. electrical signal being representative of said pressure variations since the difference in the signals presented to its inputs is directly proportional to the vertical displacement of said platen means and said attached rod-like means.

8. The improved signature identification of claim 7 wherein each of said first, second and third electrical coil means comprises;

a bobbin means having a central axial bore therethrough for receiving said rod-like means for reciprocal movement therein; and an electrically conductive wire wrapped coaxially around each of said bobbin means.

9. The improved signature identification system of claim 8 wherein said means having a core portion of magnetic material comprises an upper portion of non-magnetic material having one end securely fastened to the underside of said platen means and an opposite end for positioning said core portion of magnetic material within said axially alinged bores, said core portion being responsive to the displacement of said platen means in response to the pressure variations exerted thereon when an individual signs his signature for varying the amount of magnetic material within said first and third electrical coil means in response thereto so as to cause a difference in the electrical signals induced in said first and third electrical coil means.

10. The improved signature identification system of claim 9 wherein said platen means comprises a relatively flat rigid member having a low inertia and a high resonant frequency for insuring the accuracy of the electrical A.C. signal produced by said difference amplifier means wherein said resilient means for supporting said platen means includes a pair of rubber-like block means which yield approximately 0.001 inches per ounce of pressure exerted thereon for permitting the vertical displacement of said platen means in response to the pressure exerted thereon; and wherein said pressure transducing apparatus further includes base means for rigidly supporting the lower end of said resilient support means and for rigidly supporting said means for supporting said electrical coil means in operable relation to said core of magnetic material, said base means including a block of rubber-like material attached to the bottom thereof for damping vibrations in said pressure transducing platen so as to insure a more accurate electrical A.C. signal representative of the pressure variations applied to said platen means.

* * * * *